(12) United States Patent
Fiammante

(10) Patent No.: US 10,049,235 B2
(45) Date of Patent: Aug. 14, 2018

(54) CREATING MECHANICAL STAMPS TO PRODUCE MACHINE-READABLE OPTICAL LABELS

(71) Applicant: International Business Machines Corporation, Armonk, NY (US)

(72) Inventor: Marc Fiammante, St Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/735,340

(22) Filed: Jun. 10, 2015

(65) Prior Publication Data

US 2016/0180208 A1 Jun. 23, 2016

Related U.S. Application Data

(63) Continuation of application No. 14/573,411, filed on Dec. 17, 2014.

(51) Int. Cl.
| | |
|---|---|
| *G06K 19/00* | (2006.01) |
| *G06K 1/12* | (2006.01) |
| *G06K 19/06* | (2006.01) |
| *B21D 22/00* | (2006.01) |
| *B21D 22/02* | (2006.01) |

(52) U.S. Cl.
CPC ............ *G06K 1/121* (2013.01); *B21D 22/00* (2013.01); *B21D 22/02* (2013.01); *G06K 19/06037* (2013.01); *G06K 19/06075* (2013.01); *G06K 19/06159* (2013.01)

(58) Field of Classification Search
USPC ............................................. 235/454
See application file for complete search history.

(56) References Cited

U.S. PATENT DOCUMENTS

| | | |
|---|---|---|
| 4,170,938 A | 10/1979 | Sato |
| 5,777,309 A | 7/1998 | Maltsev |
| 7,387,249 B2 | 6/2008 | Hudson et al. |
| 8,366,011 B2 | 2/2013 | Hovis et al. |
| 8,418,914 B2 | 4/2013 | Cormack |

(Continued)

FOREIGN PATENT DOCUMENTS

WO 2013152155 A1 10/2013

OTHER PUBLICATIONS

U.S. Appl. No. 14/573,411, filed Dec. 17, 2014.

(Continued)

*Primary Examiner* — Matthew Mikels
(74) *Attorney, Agent, or Firm* — Alexander G. Jochym

(57) ABSTRACT

A tool for creating mechanical stamps that produce machine-readable optical labels. The tool selects an initial element of a list of two-dimensional labels. The tool selects a pixel difference to apply to a two-dimensional label for the initial element. The tool selects a cardinality for bits in one or more bytes to encode. The tool determines whether a cardinality of a bit difference for each element compared to the initial element equals the selected bit difference cardinality. The tool determines whether a pixel difference between a two-dimensional label for each element and the two-dimensional label for the initial element equals the selected pixel difference. The tool selects one or more elements from the list of two-dimensional labels to create one or more mechanical stamps.

9 Claims, 6 Drawing Sheets

(56) References Cited

U.S. PATENT DOCUMENTS

| | | |
|---|---|---|
| 8,494,282 B2 | 7/2013 | Gaubatz |
| 2003/0047095 A1 | 3/2003 | Cho |
| 2008/0302866 A1 | 12/2008 | Baugh et al. |
| 2013/0021364 A1 | 1/2013 | Azuma et al. |
| 2013/0026241 A1 | 1/2013 | Sakahashi et al. |
| 2013/0341400 A1 | 12/2013 | Lancaster-Larocque |
| 2014/0097250 A1* | 4/2014 | Antognini ............ G06K 7/1404 235/454 |
| 2015/0161495 A1 | 6/2015 | Rodriguez et al. |
| 2015/0248602 A1 | 9/2015 | Redd |
| 2016/0094345 A1 | 3/2016 | Chen et al. |
| 2016/0180118 A1* | 6/2016 | Fiammante ...... G06K 19/06037 235/494 |
| 2016/0180208 A1 | 6/2016 | Fiammante |

OTHER PUBLICATIONS

List of IBM Patents or Patent Applications Treated as Related (Appendix P), filed herewith.
Appendix P: List of IBM Patents or Patent Applications Treated as Related, Dated Oct. 25, 2016, pp. 1-2.
U.S. Appl. No. 15/333,474, filed Oct. 26, 2016; Entitled "Creating Mechanical Stamps to Produce Machine-Readable Optical Labels".

* cited by examiner

CREATING MECHANICAL STAMPS TO PRODUCE MACHINE-READABLE OPTICAL LABELS

BACKGROUND OF THE INVENTION

The present invention relates generally to business process tracking, and more particularly to creating mechanical stamps to produce machine-readable optical labels.

Quick Response (QR) code is a type of matrix barcode first designed for the automotive industry in Japan. A barcode is a machine-readable optical label that contains information about the item to which it is attached. A QR code uses four standardized encoding modes, including a numeric mode, an alphanumeric mode, a bit (binary) mode, and a kanji mode, to efficiently store data.

QR code systems became popular outside the automotive industry due to faster readability and greater storage capacity compared to a standard Universal Product Code (UPC) barcodes. Applications for QR code systems include product tracking, item identification, time tracking, document management, and general marketing, etc.

A QR code consists of black modules (i.e., square dots) arranged in a square grid on a white background, which can be read by an imaging device, such as a camera, and processed, for example, by using Reed-Solomon error correction until the image can be appropriately interpreted. Data is extracted from patterns present in both horizontal and vertical components of the QR code.

In the current state of the art, production of two-dimensional (2D) machine-readable labels, such as a QR code, requires computation of the QR code by a computer at the time of the production of the QR code.

SUMMARY

Aspects of an embodiment of the present invention disclose a method, system, and computer program product for creating mechanical stamps that produce machine-readable optical labels. The method includes selecting, by one or more computer processors, an initial element of a list of two-dimensional labels. The method includes selecting, by one or more computer processors, a pixel difference to apply to a two-dimensional label for the initial element. The method includes selecting, by one or more computer processors, a cardinality for bits in one or more bytes to encode. The method includes determining, by one or more computer processors, whether a cardinality of a bit difference for each element compared to the initial element equals the selected bit difference cardinality. The method includes determining, by one or more computer processors, whether a pixel difference between a two-dimensional label for each element and the two-dimensional label for the initial element equals the selected pixel difference. The method includes selecting, by one or more computer processors, one or more elements from the list of two-dimensional labels to create one or more mechanical stamps.

DETAILED DESCRIPTION

Implementation of such embodiments may take a variety of forms, and exemplary implementation details are discussed subsequently with reference to the Figures.

As will be appreciated by one skilled in the art, aspects of the present invention may be embodied as a method or system. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable media having computer readable program code/instructions embodied thereon.

Figure 1:
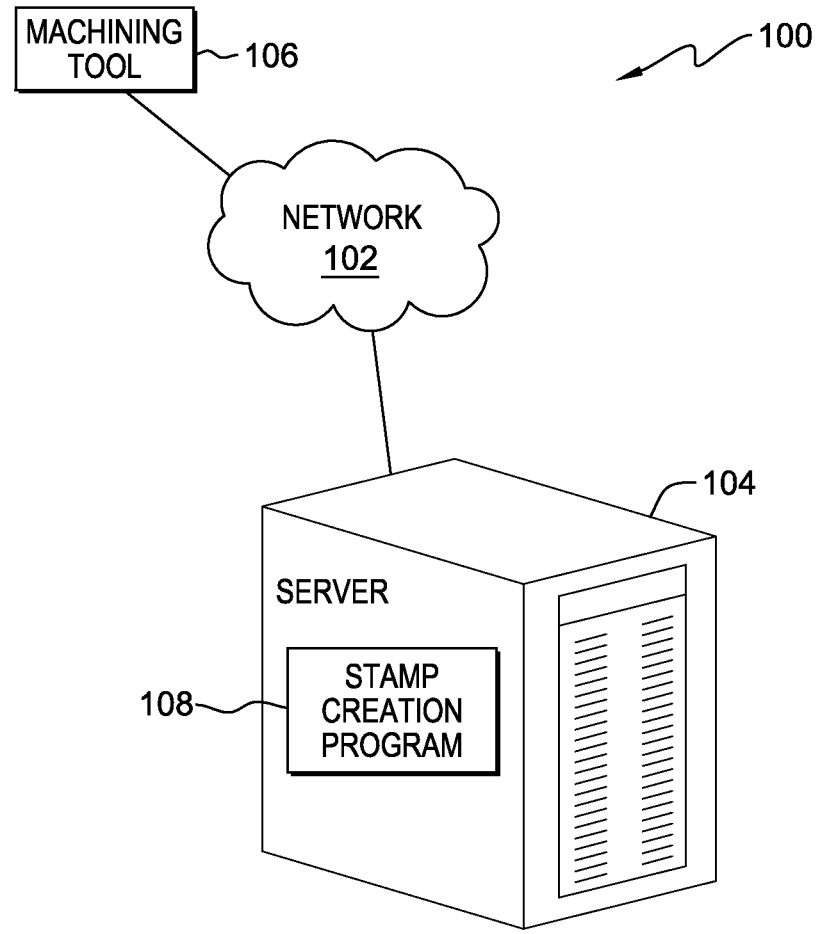
FIG. 1 is a functional block diagram illustrating a data processing environment, generally designated 100, in accordance with an embodiment of the present invention.

The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 illustrates an exemplary data processing environment 100 including a network 102, a server 104, and a machining tool 106.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, machining tool 106, and stamp creation program 108 are interconnected by network 102. Network 102 can be any combination of connections and protocols capable of supporting communications between server 104, machining tool 106, and stamp creation program 108. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes stamp creation program 108.

In the exemplary embodiment, machining tool 106 is a machine for shaping or machining metal or other rigid materials, usually by cutting, boring, grinding, shearing, or other forms of deformation. Typically, machine tools employ some sort of tool that cuts and shapes a work piece, have some means of constraining the work piece, and provide a means for guided movement of components of the machine. Thus, relative movement between the work piece and the cutting tool (i.e., the tool path) is controlled or constrained by the machine to at least some extent, rather than being entirely offhand. In the one embodiment, machining tool 106 can be a multitasking machine (MTM), such as a computerized numerical control (CNC) machine tool, with many axes that combine turning, milling, grinding, and material handling into one highly automated programmable machine tool. In the exemplary embodiment, machining tool 106 includes computing and processing capability through which to communicate with stamp creation program 108. For example, machining tool 106 may receive instructions or a stamp template from stamp creation program 108 for creating a mechanical (physical) stamp.

In the exemplary embodiment, stamp creation program 108 is a software-based program for generating machine-readable optical labels mechanically. In the exemplary embodiment, stamp creation program 108 creates a list of a plurality of machine-readable optical labels, such as QR codes, each having minimal differences from a first (seed) QR code. The minimal differences from the seed are a bit difference in pixels to apply across a number of possible elements of the list. Stamp creation program 108 selects from the list a number of elements (QR codes) to be used, and based on the number of elements, generates one or more specific features, such as a dent, a cam, a lobe, or a groove, etc., located on a wheel. Stamp creation program 108 sends the one or more features to a milling machine, a three-dimensional printer, etc., such as machining tool 106, for generating one or more physical components, including, without limitation, a wheel, a cam, a pin, and a fixed part model (i.e., structure) to house and actuate physical components. The one or more physical components can be used as an apparatus to create mechanical stamps that produce machine-readable optical labels, such as a mechanical stamp used as a conventional rubber inking stamp for transferring machine-readable optical labels. For example, in military operations where there may be limited computer support, operators can uniquely identify a document, such as a hand written report, manually for further processing and identification by utilizing a mechanical stamp to transfer a machine-readable optical label to the document.

Figure 2:
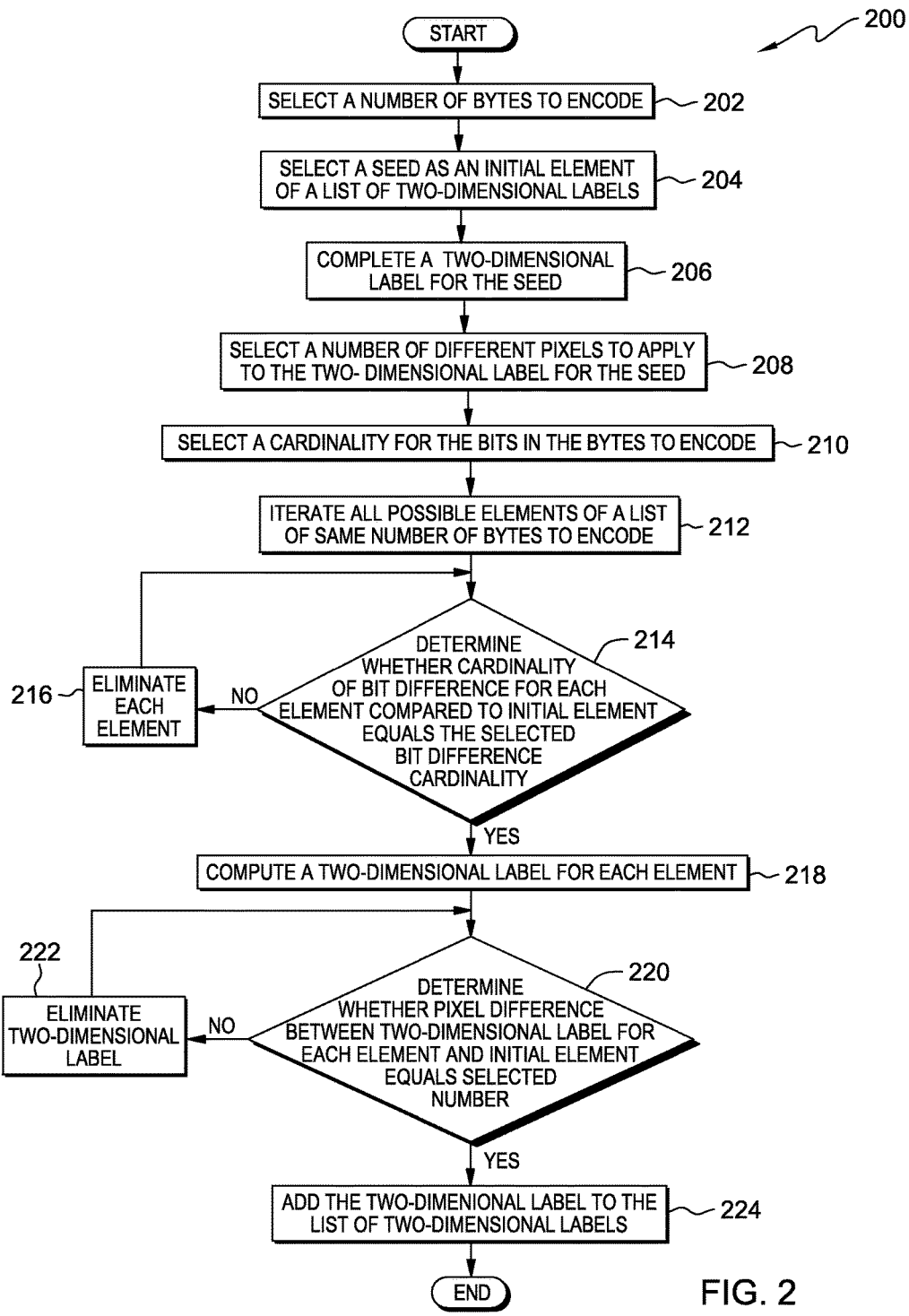
FIG. 2 depicts a flowchart, generally designated 200, of the steps of a stamp creation program for creating mechanical stamps that produce machine-readable optical labels, in accordance with an embodiment of the present invention.

FIG. 2 depicts a flowchart, generally designated 200, of the steps of stamp creation program 108 for creating mechanical stamps that produce machine-readable optical labels, in accordance with an embodiment of the present invention.

Stamp creation program 108 selects a number of bytes to encode (202). In the exemplary embodiment, stamp creation program 108 selects a number of bytes to encode by iterating with bit increments on a first byte of a first randomly generated string to encode. Stamp creation program 108 computes an error correction code corresponding to a desired two-dimensional label to generate a list of such error correction codes having a correspondence to the first randomly generated string.

Stamp creation program 108 selects a seed as an initial element of a list of two-dimensional labels (204). In the exemplary embodiment, stamp creation program 108 selects one of the error correction codes (a seed), and using the corresponding bit string of the selected error correction code as a starting point, creates another list of bit strings that have an identical error correction code and two-dimensional label mask.

Stamp creation program 108 completes a two-dimensional label for the seed (206). In the exemplary embodiment, stamp creation program 108 completes a two-dimensional label for the seed by computing the two-dimensional label for the seed with the corresponding error correction code and a pattern correction. In the exemplary embodiment, stamp creation program 108 encodes the two-dimensional label for the string corresponding to the seed to serve as a baseline for two-dimensional label comparison.

Stamp creation program 108 selects a number of different pixels to apply to the two-dimensional label for the seed (208). In the exemplary embodiment, stamp creation program 108 selects a number of different pixels (i.e., a pixel difference) to apply to the two-dimensional label for the seed. In the exemplary embodiment, stamp creation program 108 selects a pixel difference by selecting a number of different pixels to apply to the two-dimensional label for the seed, wherein the number of different pixels is equal to, or greater than, the bit difference. In one embodiment, stamp creation program 108 provides a user with an ability to set the pixel difference, for example, a two pixel difference.

Stamp creation program 108 selects a cardinality for bits in the number of bytes to encode (210). In the exemplary embodiment, stamp creation program 108 selects a cardinality for bits in the number of bytes to encode by selecting a bit difference cardinality between the initial element and a second element. In the exemplary embodiment, stamp creation program 108 selects a bit difference cardinality between the initial element (i.e., the seed) and a second element in the list of two-dimensional labels by defining a number of different bits to apply to the two-dimensional label for the seed in a plurality of two-dimensional labels for variant elements. In the exemplary embodiment, stamp creation program 108 selects a bit difference between two bit strings in the list of two-dimensional labels that will be generated with an identical error correction code and two-dimensional label mask (e.g., two bits difference). The bit difference should be higher than the capacity of the error correction code to ensure a common error correction code can be found. In the exemplary embodiment, stamp creation program 108 defines the bit difference between two encoded two-dimensional labels generated from the strings, such that the bit difference can be equal to, or different from, the bit difference between strings prior to encoding. In an alternative embodiment, stamp creation program 108 may define a maximum number (i.e., maximum differing bits) for the bit difference that can be applied to two bit strings in the list of two -dimensional labels.

Stamp creation program 108 iterates all possible elements of the list of a list of the same number of bytes to encode (212). In the exemplary embodiment, stamp creation program 108 iterates all possible elements of the list of two-dimensional labels by iterating on the bit string corresponding to the seed a value to generate a second string. In the exemplary embodiment, stamp creation program 108 performs an exclusive disjunction operation (XOR) on bits of the second string with the string selected in step 204 (i.e., seed string), counting the bits differing between the two strings, such that they are equal to the bit difference selected in step 206.

Stamp creation program 108 determines whether cardinality of the bit difference for each element compared to the initial element equals the selected bit difference cardinality (214). In the exemplary embodiment, stamp creation program 108 determines whether cardinality of the number of bits for each element equals the selected bit difference, i.e., the selected number of bits to encode, by determining whether the bit difference between each element and the initial element (i.e., the seed) equals the selected bit difference from step 210. In some embodiments, stamp creation program 108 optionally checks that the bit difference occurs in the string of bits area of the two-dimensional label to ensure the rest of the information is constant.

In response to determining that cardinality of the number of bits for each element does not equal the bit difference (NO branch, 214), stamp creation program 108 eliminates each element (216), and continues to determine whether cardinality of the bit difference for each remaining element compared to the initial element equals the selected bit difference cardinality. In the exemplary embodiment, stamp creation program 108 eliminates each element that does not equal the defined number of different bits.

In response to determining that cardinality of the number of bits for each element equals the selected number of bits to encode (YES branch, 214), stamp creation program 108 computes a two-dimensional label for each element (218).

Stamp creation program 108 determines whether the pixel difference between the two-dimensional label for each element and the initial element equals the selected number (220). In the exemplary embodiment, stamp creation program 108 determines whether each two-dimensional label for each element differs from the two-dimensional label for initial element by the number (i.e., pixel difference) selected in step 208.

In response to determining that the pixel difference between the two-dimensional label for each element and the two-dimensional label for the initial element does not equal the selected pixel difference (NO branch, 220), stamp creation program 108 eliminates each two-dimensional label (222), and continues to determine whether the pixel difference between the two-dimensional label for each remaining element and then initial element equals the selected pixel difference.

In response to determining that the pixel difference between the two-dimensional label for each element and the two-dimensional label for the initial element equals the selected pixel difference (YES branch, 220), stamp creation program 108 adds the two-dimensional label to the list of two-dimensional labels (224). In the exemplary embodiment, stamp creation program 108 adds a new string to the list of strings and corresponding two-dimensional label for each element that has the same error correction code and for which the generated two-dimensional label differ from the two-dimensional label of the initial element (i.e., the seed) by the selected pixel difference (i.e., the selected number of differing pixels). In some embodiments, stamp creation program 108 selects a number of elements from the list of two-dimensional labels to create a physical stamp. For example, in one embodiment, the selected number of elements from the list is used to generate a fixed part model, such that each bit difference across the selected number of elements corresponds to a groove located in a cam that can be used for printing or driving a machine tool, such as machining tool 106.

Figure 3:
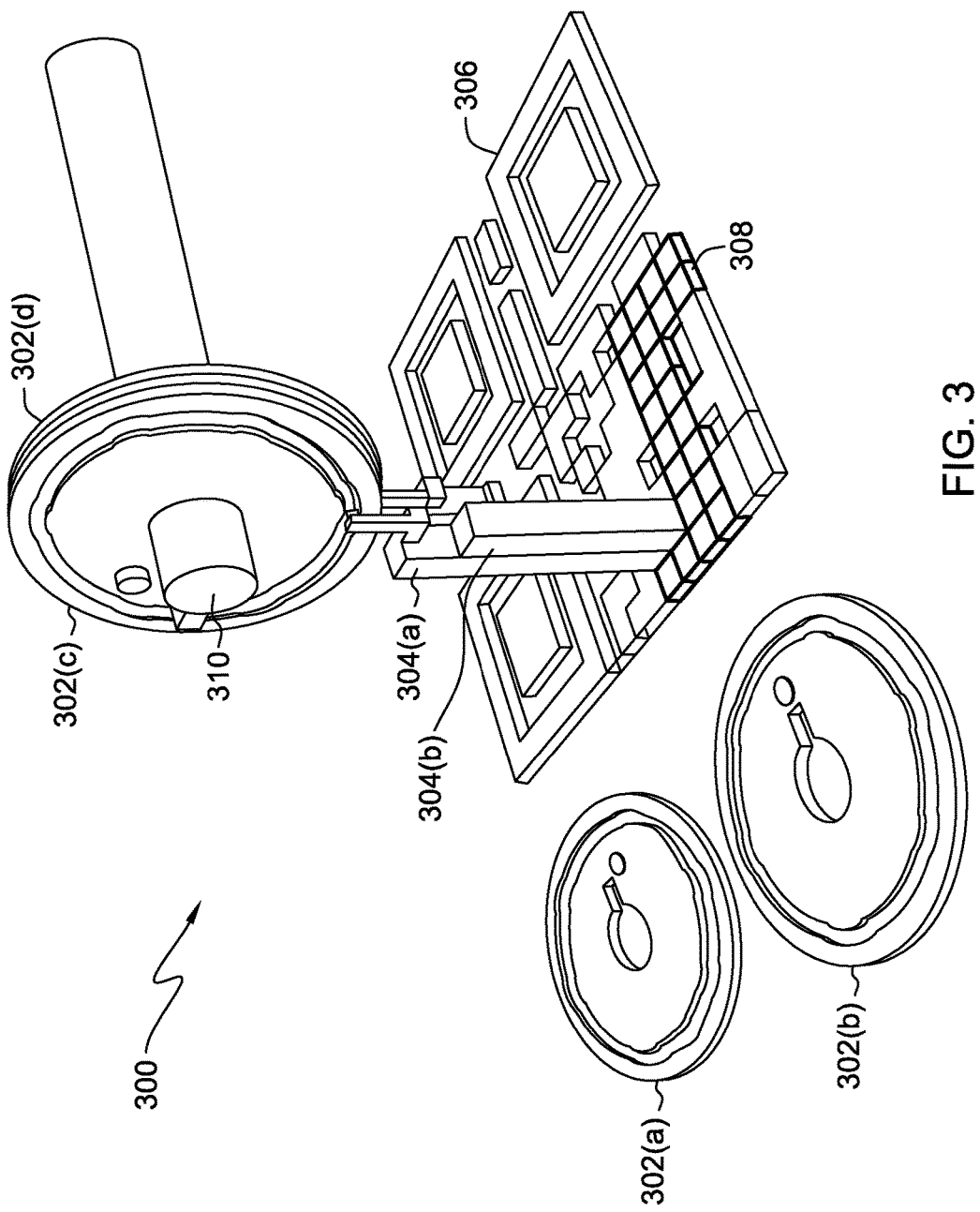
FIG. 3 is a diagram of an exemplary mechanical apparatus, generally designated 300, for creating mechanical stamps that produce machine-readable optical labels, in accordance with an embodiment of the present invention.

FIG. 3 is a diagram of an exemplary mechanical apparatus, generally designated 300, for creating mechanical stamps that produce machine-readable optical labels, in accordance with an embodiment of the present invention.

Mechanical stamping apparatus 300 includes one or more wheels, such as wheels 302(a), 302(b), 302(c), and 302(d), the one or more wheels having a plurality of features, such as a hole, a cam, and a lobe, etc., for representing a physical difference for a pixel that carries a difference. The one or more wheels include at least one feature for locating the one or more wheels on a shaft, such as shaft 310, the at least one feature ensuring that the one or more wheels, such as wheels 302(a), 302(b), 302(c), and 302(d), can be assembled in a given order, such as by matching a corresponding keyhole and physical dent with an adjacent wheel.

In one embodiment, the shaft is a rotating shaft, wherein the rotating shaft can be actuated by, for example, a hand crank, a worm drive gear, or a automated belt drive, etc. In the exemplary embodiment, each of plurality of features, such as a hole, a cam, and a lobe, etc. of the one or more wheels actuates a corresponding pin, such as pin 304(a) and 304(b). Each pin, such as pin 304(a) and 304(b), is designed such that a top end fits within (i.e., contact) a specific feature on the one or more wheels, and a bottom end fits specifically within a one bit coordinate in a bit zone on a physical two-dimensional label. For example, pin 304(a) is designed to fit within a one bit coordinate in bit zone 308 on physical two-dimensional label 306, such that as the one or more wheels rotate, pin 304(a) will transmit bit information to physical two-dimensional label 306 only when actuated by, for example, a cam contacting pin 304(a) individually. For example, at least one cam on the one or more wheels contacts an arm or other protrusion located on each pin.

In the exemplary embodiment, physical two-dimensional label 306 is a pre-machined common shape that represents unchanging pixels that includes bit zone 308 for insertion of mechanical varying pixels via a corresponding pin, such as pin 304(a) and 304(b). Mechanical apparatus 300 creates one or more mechanical stamps that can be utilized as a conventional rubber stamp with an inking pad to transfer a machine-readable optical label to any object that can accept an inked marking, such as a paper document, a cardboard box, and a package, etc.

Figure 4:
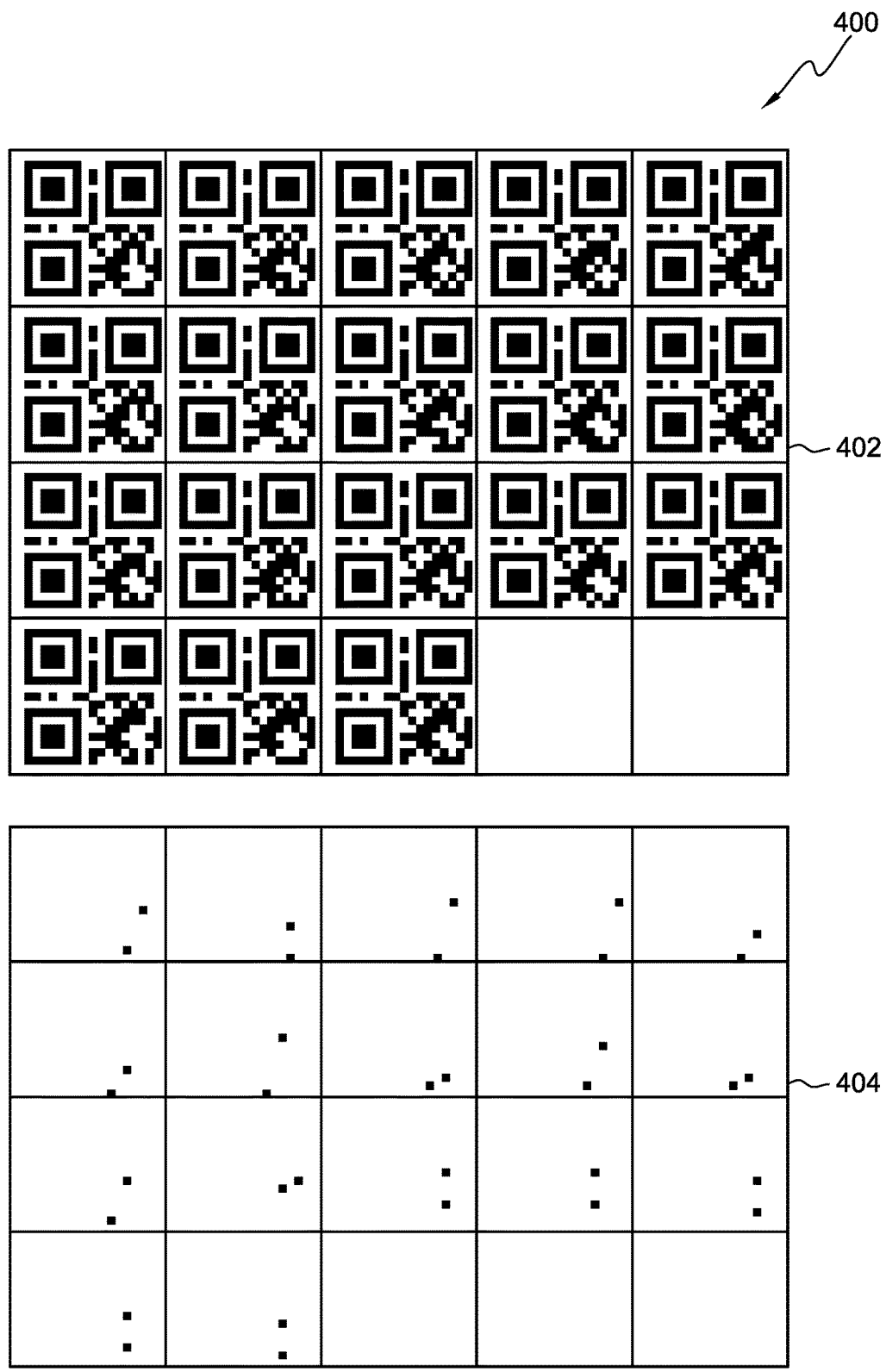
FIG. 4 illustrates a graphical representation of a list of two-dimensional labels, generally designated 400, for creating mechanical stamps that produce machine-readable optical labels, in accordance with an embodiment of the present invention.

FIG. 4 illustrates a graphical representation of a list of two-dimensional labels, generally designated 400, for creating mechanical stamps that produce machine-readable optical labels, in accordance with an embodiment of the present invention.

In the exemplary embodiment, QR code list 402 represents eighteen machine-readable optical labels that differ from each other by two bits. Generally, QR code standard normally begins with a minimum size of twenty-one by twenty-one pixels, with nineteen payload bytes and seven error correction bytes. In the exemplary embodiment, QR code list 402 represents a simplified QR code standard, having a seventeen by seventeen pixel size, with five payload bytes and one error correction byte. In the exemplary embodiment, QR code list 402 includes a QR code based on a seed and seventeen variations of the QR code based on the seed, the variations only differing by two pixels within a designated bit zone.

In the exemplary embodiment, XOR list 404 represents the seventeen variations of the seed, the variations only differing by two pixels within the designated bit zone.

Figure 5:
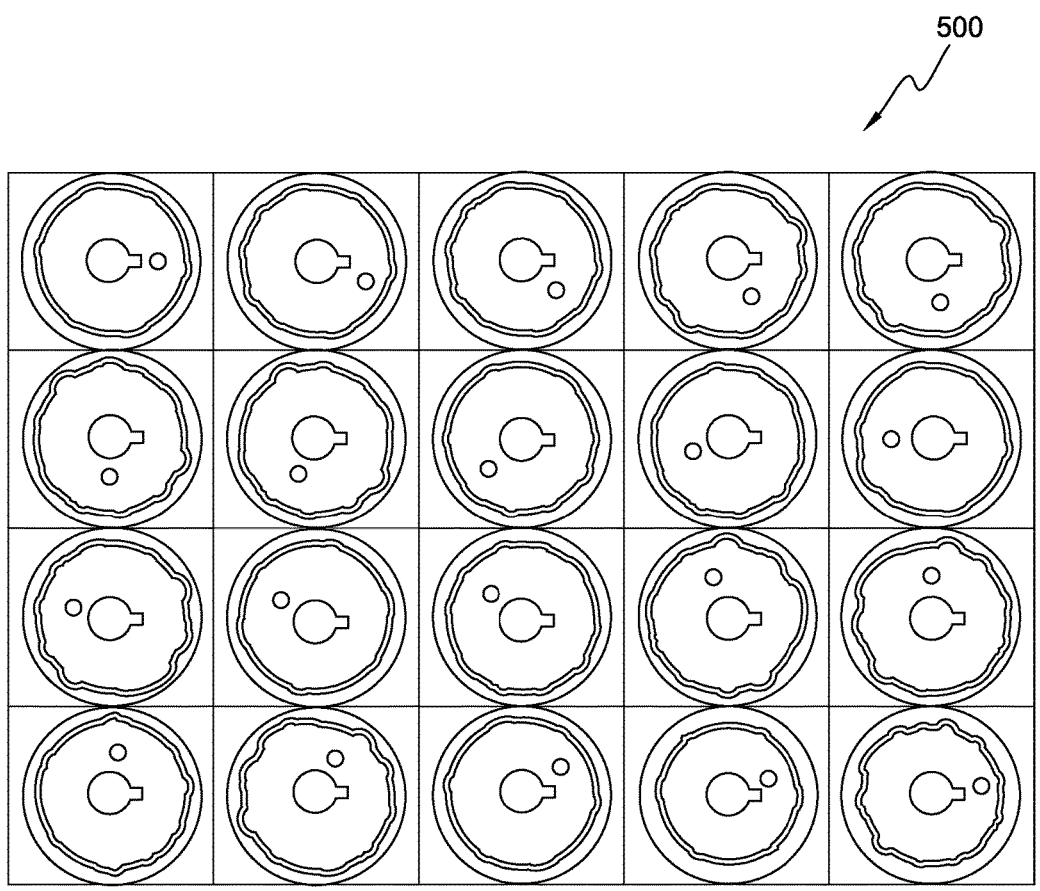
FIG. 5 illustrates a graphical representation of a plurality of wheels, generally designated 500, for creating mechanical stamps that produce machine-readable optical labels, in accordance with an embodiment of the present invention.

FIG. 5 illustrates a graphical representation of a plurality of wheels, such as wheels 302(*a*), 302(*b*), 302(*c*), and 302(*d*), generally designated 500, for creating mechanical stamps that produce machine-readable optical labels, in accordance with an embodiment of the present invention.

In the exemplary embodiment, the one or more wheels include at least one cam that moves a pin corresponding to each of a plurality of variations in pixels across a plurality of machine-readable optical labels. The wheel layout is generated programmatically such that automated machining and three-dimensional printing can be utilized. The one or more wheels have a physical shape that ensures the at least one cam is aligned with a pin. In addition, other shapes, such as a keyway or hole, ensure that the wheels are assembled (e.g., stacked) in a correct order. In some embodiments, the at least one cam can be a groove that drives a pin accordingly from a right angle bending on the pin that enters a groove. The pin is generated with an index and X and Y axis information to ensure the pin is oriented at a correct location on a two-dimensional label (i.e., at a specific bit coordinate within a bit zone).

Figure 6:
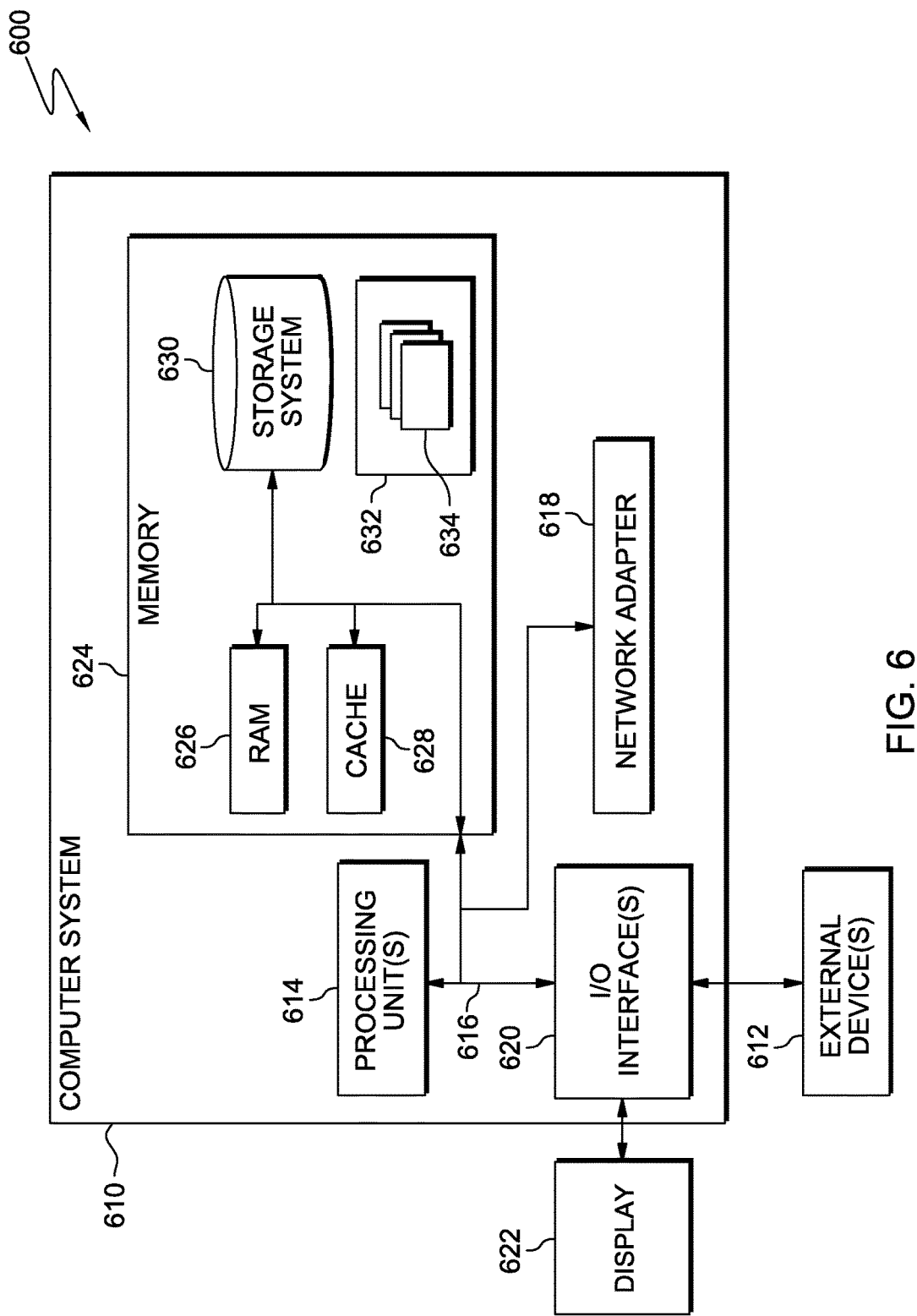
FIG. 6 depicts a block diagram depicting components of a data processing system (such as the server of FIG. 1), generally designated 600, in accordance with an embodiment of the present invention.

FIG. 6 depicts a block diagram of components of a data processing system, generally designated 600, in data processing environment 100, such as server 104 in accordance with an illustrative embodiment of the present invention. It should be appreciated that FIG. 6 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device. The components of computer 610 may include, but are not limited to, one or more processors or processing unit(s) 614, memory 624, and bus 616 that couples various system components including memory 624 to processing unit(s) 614.

Bus 616 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 610 typically includes a variety of computer system readable media. Such media may be any available media that is accessible by computer 610, and it includes both volatile and non-volatile media, removable and non-removable media.

Memory 624 can include computer system readable media in the form of volatile memory, such as random access memory (RAM) 626 and/or cache memory 628. Computer 610 may further include other removable/non-removable, volatile/non-volatile computer system storage media. By way of example only, storage system 630 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 616 by one or more data media interfaces. As will be further depicted and described below, memory 624 may include at least one computer program product having a set (e.g., at least one) of program modules that are configured to carry out the functions of embodiments of the invention.

Program/utility 632, having one or more sets of program modules 634, may be stored in memory 624 by way of example, and not limitation, as well as an operating system, one or more application programs, other program modules, and program data. Each of the operating systems, one or more application programs, other program modules, and program data, or some combination thereof, may include an implementation of a networking environment. Program modules 634 generally carry out the functions and/or methodologies of embodiments of the invention as described herein. Computer 610 may also communicate with one or more external device(s) 612 such as a keyboard, a pointing device, a display 622, etc., or one or more devices that enable a user to interact with computer 610 and any devices (e.g., network card, modem, etc.) that enable computer 610 to communicate with one or more other computing devices. Such communication can occur via Input/Output (I/O) interface(s) 620. Still yet, computer 610 can communicate with one or more networks such as a local area network (LAN), a general wide area network (WAN), and/or a public network (e.g., the Internet) via network adapter 618. As depicted, network adapter 618 communicates with the other components of computer 610 via bus 616. It should be understood that although not shown, other hardware and software components, such as microcode, device drivers, redundant processing units, external disk drive arrays, RAID systems, tape drives, and data archival storage systems may be used in conjunction with computer 610.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for creating mechanical stamps that produce machine-readable optical labels, the method comprising:
   selecting, by one or more computer processors, an initial element of a list of two-dimensional labels;
   selecting, by one or more computer processors, a pixel difference to apply to a two-dimensional label for the initial element;
   selecting, by one or more computer processors, a cardinality for bits in one or more bytes to encode;
   determining, by one or more computer processors, whether a cardinality of a bit difference for each element compared to the initial element equals a selected bit difference cardinality;
   determining, by one or more computer processors, whether a pixel difference between a two-dimensional label for each element and the two-dimensional label for the initial element equals a selected pixel difference; and selecting, by one or more computer processors, one or more elements from the list of two-dimensional labels to create one or more mechanical stamps;

determining, by one or more computer processors, one or more specific features of a machined component based, at least in part, on the one or more elements from the list of two-dimensional labels, wherein the one or more specific features of the machined component include one or more wheels, the one or more wheels including at least one cam lobe, and at least one pin, the at least one pin mated at one end to the at least one cam lobe on the one or more wheels; and sending, by one or more computer processors, the one or more specific features of the machined component to a machining tool for generating the machined component.

2. The method of claim 1, wherein selecting an initial element of a list of two-dimensional labels, further comprises:

selecting, by one or more computer processors, a number of bytes to encode.

3. The method of claim 1, wherein selecting a pixel difference to apply to a two-dimensional label for the initial element, further comprises:

computing, by one or more computer processors, a two-dimensional label for the initial element with a corresponding error correction code.

4. The method of claim 1, wherein selecting a cardinality for bits in one or more bytes to encode, further comprises:

selecting, by one or more computer processors, a bit difference between the initial element and a second element in the list of two-dimensional labels, wherein selecting the bit difference includes defining a number of different bits to apply to the two-dimensional label for the initial element in a plurality of two-dimensional labels for variant elements.

5. The method of claim 1, the method further comprising:

responsive to a determination that cardinality of a number of bits for each element does not equal the bit difference, eliminating, by one or more computer processors, each element that does not equal a defined number of different bits.

6. The method of claim 1, the method further comprising:

responsive to a determination that cardinality of a number of bits for each element equals a selected number of bits to encode, computing, by one or more computer processors, a two dimensional label for each element that equals the selected number of bits to encode.

7. The method of claim 1, the method further comprising:

responsive to a determination that the pixel difference between the two-dimensional label for each element and the two-dimensional label for the initial element does not equal the selected pixel difference, eliminating, by one or more computer processors, each two-dimensional label for each element that does not equal the selected pixel difference.

8. The method of claim 1, the method further comprising:

responsive to a determination that the pixel difference between the two-dimensional label for each element and the two-dimensional label for the initial element equals the selected pixel difference, adding, by one or more computer processors, the two-dimensional label for each element that equals the selected pixel difference to the list of two-dimensional labels.

9. The method of claim 8, wherein adding the two-dimensional label to the list of two-dimensional labels, further comprises:

adding, by one or more computer processors, a new string to a list of strings and a corresponding two-dimensional label for each element that has an error correction code and for which a generated two-dimensional label differ from the two-dimensional label of the initial element by the selected pixel difference.

* * * * *